United States Patent

Hatsukano

[11] 3,896,430
[45] July 22, 1975

[54] DRIVING SYSTEM FOR LIQUID CRYSTAL DISPLAY DEVICE

[75] Inventor: Yoshikazu Hatsukano, Kodaira, Japan

[73] Assignee: Hitachi, Ltd., Japan

[22] Filed: Nov. 27, 1973

[21] Appl. No.: 419,442

[30] Foreign Application Priority Data
Nov. 27, 1972  Japan............................ 47-118074

[52] U.S. Cl............................ 340/336; 350/160 LC
[51] Int. Cl.² ........................................... G08B 5/36
[58] Field of Search......... 340/324 R, 336; 307/313; 350/160 LC

[56] References Cited
UNITED STATES PATENTS

| | | | |
|---|---|---|---|
| 3,653,745 | 4/1972 | Mao | 350/160 LC |
| 3,740,717 | 6/1973 | Huener et al. | 340/166 EL |
| 3,760,406 | 9/1973 | Walton | 340/336 |
| 3,776,615 | 12/1973 | Tsukamoto et al. | 350/160 LC |
| 3,780,523 | 12/1973 | Naito | 340/336 X |
| 3,781,864 | 12/1973 | Fujita | 340/336 |
| 3,789,388 | 1/1974 | Medwin | 340/336 |
| 3,797,225 | 3/1974 | Hama et al. | 350/160 LC |

*Primary Examiner*—David L. Trafton
*Attorney, Agent, or Firm*—Craig & Antonelli

[57] ABSTRACT

A driving system for a liquid crystal display device includes a first and common electrode, a plurality of second electrodes, and a liquid crystal interposed between the first and second electrodes and has a visual threshold voltage at which the state of the liquid crystal changes visually. A potential difference not smaller than the visual threshold voltage is applied between the first electrode and a selected one or more of the second electrodes. A medium potential between potentials applied to the first electrode and to the selected second electrode or electrodes is applied to the second electrodes which are not selected. The potential difference between the medium potential and the potential applied to the first electrode is smaller than the visual threshold voltage.

6 Claims, 7 Drawing Figures

DRIVING SYSTEM OR LIQUID CRYSTAL DISPLAY DEVICE

BACKGROUND OF THE INVENTION

1. Field of the Invention

The present invention relates to a driving system for a liquid crystal display device which, mechanically, has the property of a liquid and which optically has the property of a solid (crystal).

2. Description of the Prior Art

With respect to the characteristic of low power consumption, the liquid crystal display device has come into particular use in devices such as an electronic wrist watch, a small-sized electronic desk calculator, etc. having a battery drive.

For the physical operational modes of the liquid crystal display device, there have been known the dynamic scattering mode (DSM), the field effect mode (FEM), etc. For the optical operation modes, there have been known the reflection type, the transmission type, the absorption type, etc.

The present invention can be commonly applied to any of the modes.

Here, explanation will be made with the DSM reflection type taken as an example.

The DSM reflection type liquid crystal display device exploits the phenomenon called the dynamic scattering mode in which, when a liquid crystal is placed between two opposing electrodes and a voltage is applied therebetween, the molecules of the liquid crystal having been arrayed in an initial fixed direction are irregularly oriented, so that incident light is scattered and that the liquid crystal is changed from a transparent state to a semitransparent (whitish) state. The construction and phenomenon of such a liquid crystal display device are described in, for example, the following literature: "Electronics," July 6, 1970, pp. 64–70; "Transistor Gijutsu" (a Japanese publication), August 1971, pp. 104–109.

In designing a driver circuit for such a liquid crystal display device, attention must be paid to the problem stated below.

In the liquid crystal display device of, for example, the segment type which is provided for one common electrode (digit electrode) with a plurality of segment electrodes arranged in a shape which can represent predetermined numerals, a liquid crystal corresponding to the segment electrode which is not selected induces scattering due to the voltage applied to the selected segment electrode. As a result, the numeral is blurred during indication.

SUMMARY OF THE INVENTION

It is, accordingly, an object of the present invention to provide a driving system for a liquid crystal display device which can eliminate such a problem.

In order to accomplish this object, the present invention includes a liquid crystal display device which has a visual threshold voltage $V_{th}$ so as to eliminate the foregoing problem by exploiting the presence of the threshold voltage.

Among liquid crystals, there are known those whose visual state gradually changes in dependence on the applied voltage and those in which, as illustrated in the characteristic diagram of FIG. 1 of the accompanying drawings, the visual state rapidly changes with the boundary at a certain determined applied voltage; in other words, which have a visual threshold voltage. Liquid crystal display devices of the latter type are described in, for example, "Applied Physics Letters," Vol. 19, No. 10, pp. 391–393, "Transistor Gijutsu" previously mentioned, and the catalog of a liquid crystal display device put on the market under the product name "DNM - 1" by Dai-Nippon Toryo Co., Ltd. (a Japanese manufacturer).

Employed in the present invention is the latter type of liquid crystal display device.

In accordance with an embodiment of the present invention, voltage sources of three-valued levels ($V_H$, $V_M$ and $V_L$) are provided, a potential difference $|V_H - V_L|$ is applied between a segment electrode selected and a common electrode, and the medium potential $V_M$ between the potential $V_H$ and the potential $V_L$ ($V_H > V_M > V_L$) is applied to the non-selected segment electrodes.

The potential difference $|V_H - V_L|$ is made larger than the threshold voltage $V_{th}$, while a potential difference $|V_H - V_M|$ or a potential difference $|V_M - V_L|$ is made smaller than the threshold voltage $V_{th}$.

According to such a driving system for a liquid crystal display device, only the potential difference $|V_M - V_L|$ or the potential difference $|V_H - V_M|$ is applied between the selected segment electrode and the other segment electrodes, whereas a large potential difference such as $|V_H - V_L|$ is not applied. Therefore, it is possible to prevent a change in the visual state of the liquid crystal attributed to the potential difference between the segment electrodes. Moreover, it is possible to prevent crosstalk which comes into question in a prior-art driver circuit for matrix type liquid crystal display devices ("Nikkei Electronics," May 8, 1972, pp. 32–43).

The present invention itself and further objects of the present invention will become apparent from the following description taken in conjunction with the accompanying drawings.

BRIEF DESCRIPTION OF THE DRAWINGS

FIG. 2a is a diagram of a driver circuit for a liquid crystal display device according to the present invention, while

FIG. 3a is a diagram of another embodiment of the driver circuit, while FIG. 4a is a diagram of a circuit for the dynamic drive of liquid crystal display devices according to the present invention, while

DETAILED DESCRIPTION OF THE INVENTION

Figure 1:
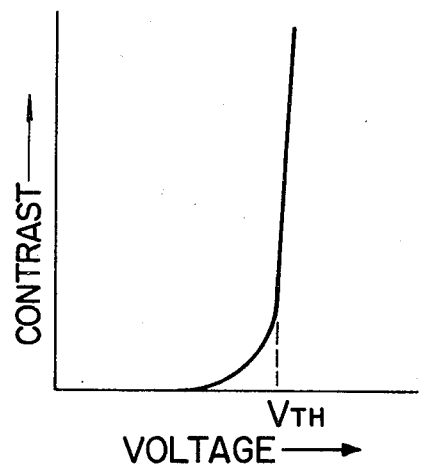
FIG. 1 is the diagram of the characteristic of a liquid crystal, to which reference has already been made.
Figure 2A:
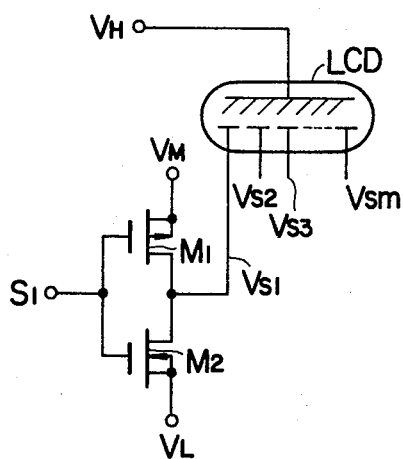

FIG. 2a shows a driver circuit which is constructed in conformity with the driving system for a liquid crystal display device according to the present invention.

In the figure, LCD designates a liquid crystal display device. In the display device, the oblique line portion represents a liquid crystal, the electrode on the upper side is a common electrode, and the plurality of ($m$) electrodes on the lower side are segment electrodes which are so arranged that predetermined letters, numerals or the like can be represented.

M₁ indicates an insulated gate field-effect transistor (hereinbelow termed "transistor") of the P-channel type, and M₂ a transistor of the N-channel type. The transistors M₁ and M₂ constitute a complementary circuit. The respective source electrodes are connected to voltage sources $V_M$ and $V_L$, while the respective gate electrodes are applied to receive a segment selecting signal $S_1$.

A high voltage potential $V_H$ is applied to the common electrode of the liquid crystal display device LCD. An output signal of the complementary circuit driven by the segment signal $S_1$ is applied to one of the segment electrodes.

Figure 2B:
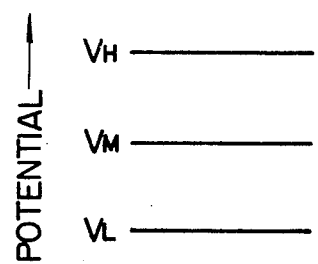
FIG. 2b is a diagram for explaining the levels of voltage sources for use in the driver circuit.

The relations among the voltages $V_H$, $V_M$ and $V_L$ are as illustrated in FIG. 2b, and the respective values are so determined as to satisfy the following inequalities:

$$|V_H - V_L| \geq |V_{th}|, \quad V_H - V_M| < V_{th}$$

The operation of the circuit will now be described.

When the segment selecting signal $S_1$ becomes 1 (positive potential) to select the segment electrode at the left end as viewed in FIG. 2a, the transistor $M_2$ is rendered conductive to apply the low potential $V_L$ to the segment electrode. Then, the corresponding part of the liquid crystal induces scattering.

On the other hand, when this segment electrode is not selected, the segment selecting signal becomes 0 (ground potential), and the transistor $M_1$ is rendered conductive. Accordingly, this segment electrode is applied with the medium potential $V_M$, and the corresponding liquid-crystal part induces no scattering.

Similarly, the other segment electrodes are also applied with the low potential $V_L$ when selected, and with the medium potential $V_M$ when not selected.

As a consequence, a potential difference of only $|V_M - V_L|$ is applied between the segment electrode selected and the segment electrode not selected. The potential difference $|V_H - V_L|$ between the selected segment electrode and the common electrode is prevented from being applied between the segment electrodes. The difference is made smaller, so that the foregoing problem is overcome.

Figure 3A:
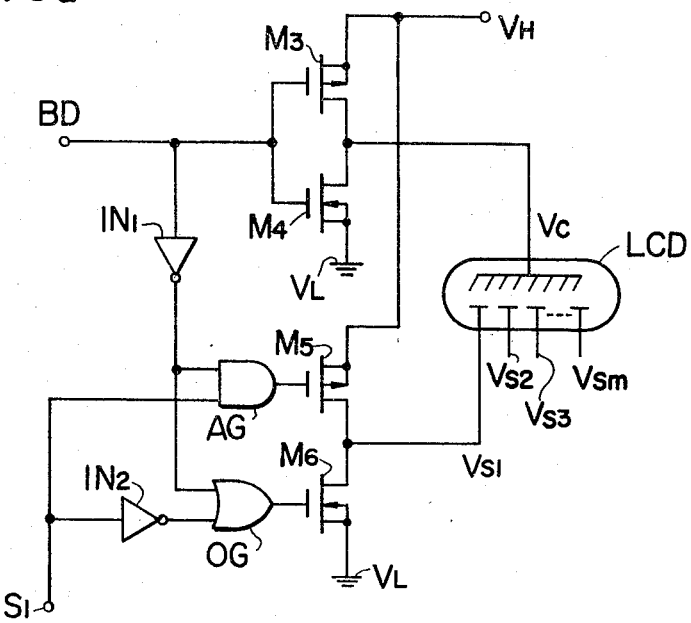

FIG. 3a shows another embodiment of the driver circuit for explaining the driving system for a liquid crystal display device according to the present invention.

The essential difference between the circuit in FIG. 3a and that in FIG. 2a is that, in order to maintain a long life for the liquid crystal, the liquid crystal is driven bidirectionally, i.e., by an AC signal. This is because, when a DC component is impressed on the liquid crystal, it is polarized to shorten its life.

In the figure, BD represents a bidirectional drive pulse for effecting such a bidirectional drive. It is directly applied to the gate electrodes of transistors $M_3$ and $M_4$. It is also applied through an inverter circuit IN₁ and an AND circuit AG or an OR circuit OG to the gate electrodes of transistors $M_5$ and $M_6$. The segment signal $S_1$ is applied to another input terminal of the AND circuit AG, while the inverted signal of the segment signal $S_1$ is applied to another input terminal of the OR circuit OG.

An output voltage of a complementary circuit on the upper side including the transistors $M_3$ and $M_4$ is supplied to the common electrode. An output voltage of a complementary circuit on the lower side including the transistors $M_5$ and $M_6$ is supplied to one of the segment electrodes.

The operation of the circuit will now be explained.

Figure 3B:
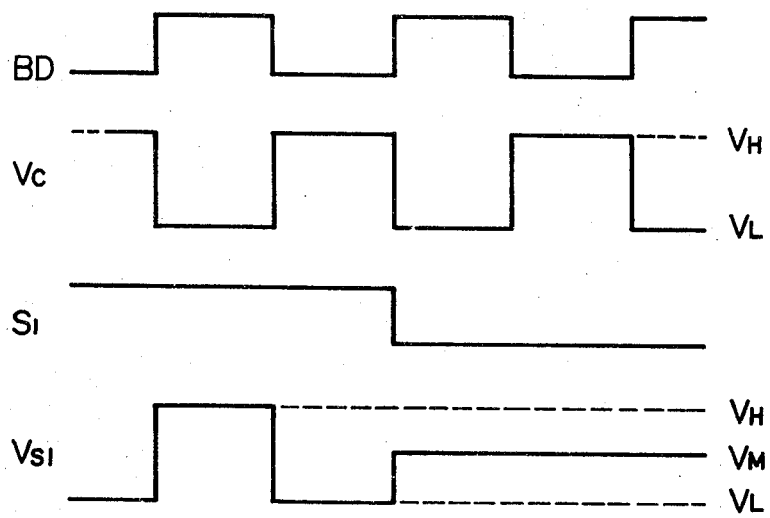
FIG. 3b is a timing diagram for explaining the operation thereof.

When the left-end segment electrode is to be selected, the segment signal $S_1$ becomes 1 to enable the AND gate AG and the OR gate OG, and the gate electrodes of the transistors $M_5$ and $M_6$ are both applied with the inverted signal of the bidirectional drive pulse BD. On the other hand, the gate electrodes of the transistors $M_3$ and $M_4$ are both applied with the bidirectional drive pulse BD. Consequently, AC pulses having the level difference $|V_H - V_L|$ are applied between this segment electrode and the common electrode in synchronism with the bidirectional drive pulses BD. That is, as seen from the timing diagram of FIG. 3b, in a certain period, the voltage $V_c$ applied to the common electrode is the potential $V_H$, and the voltage $V_{sl}$ applied to the left-end segment electrode is the potential $V_L$ (ground potential). In the subsequent period, the relation is reversed (namely, the polarities are inverted), and $V_c = V_L$ and $V_{sl} = V_H$. It is needless to say that, in this case, that part of the liquid crystal which lies between the electrodes induces scattering ($|V_H - V_L| \geq V_{th}$).

Where the left-end segment electrode is not to be selected, the segment selecting signal $S_1$ becomes 0 to disable the AND gate AG and the OR gate OG. The gate levels of the transistors $M_5$ and $M_6$ become 0 and 1 irrespective of the bidirectional drive pulse BD, respectively, and both the transistors $M_5$ and $M_6$ are rendered conductive. At this time, the complementary circuit constitutes a voltage divider, and the divided voltage $V_M$ appears at the segment electrode (refer to $V_{sl}$ in FIG. 3b). If the divided voltage $V_M$ is chosen so that:

$$|V_H - V_M| < V_{th} \text{ and } |V_M - V_L| < V_{th},$$

then that part of the liquid crystal which corresponds to the segment does not induce scattering. In this case, the common electrode takes the values $V_H$ and $V_L$ in synchronism with the bidirectional drive pulses BD. Therefore, in order to prevent any DC component from being impressed on the liquid crystal, it is more preferable to set the medium potential $V_M$ at the following value or to bring it as close to the value as possible:

$$V_H - V_M = V_M - V_L \quad \therefore V_M = \frac{V_H + V_L}{2}$$

The foregoing operation is tabulated below.

Table I

| $S_1$ | BD | $V_{sl}$ | $V_c$ |
|---|---|---|---|
| "1" | "1" | $V_H$ | $V_L$ |
| "1" | "0" | $V_L$ | $V_H$ |
| "0" | "1" | $V_M$ | $V_L$ |
| "0" | "0" | $V_M$ | $V_H$ |

Figure 4A:
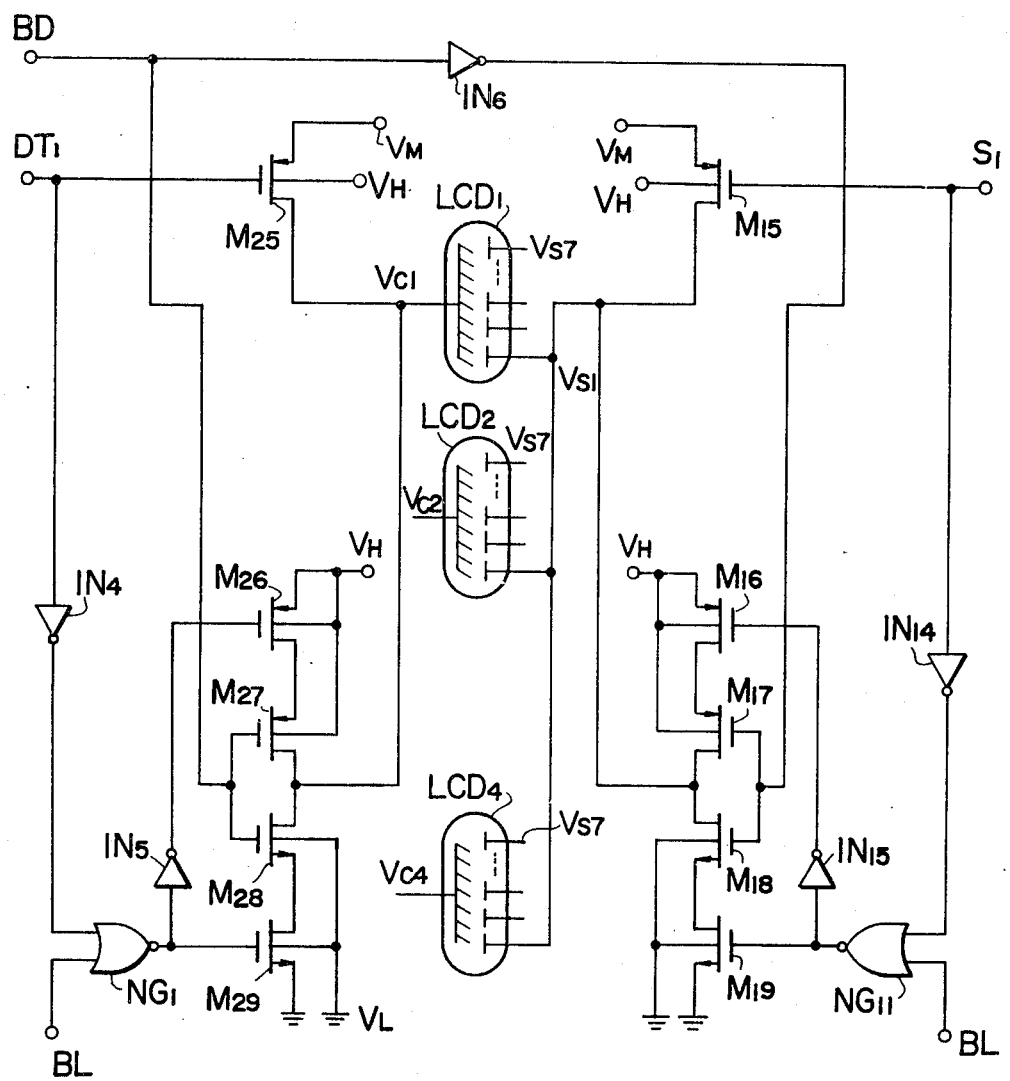

FIG. 4a shows a dynamic drive circuit for liquid crystal display devices according to the present invention. This embodiment improves the circuit in FIG. 3a with respect to power consumption, and has differences as stated below.

Figure 4B:
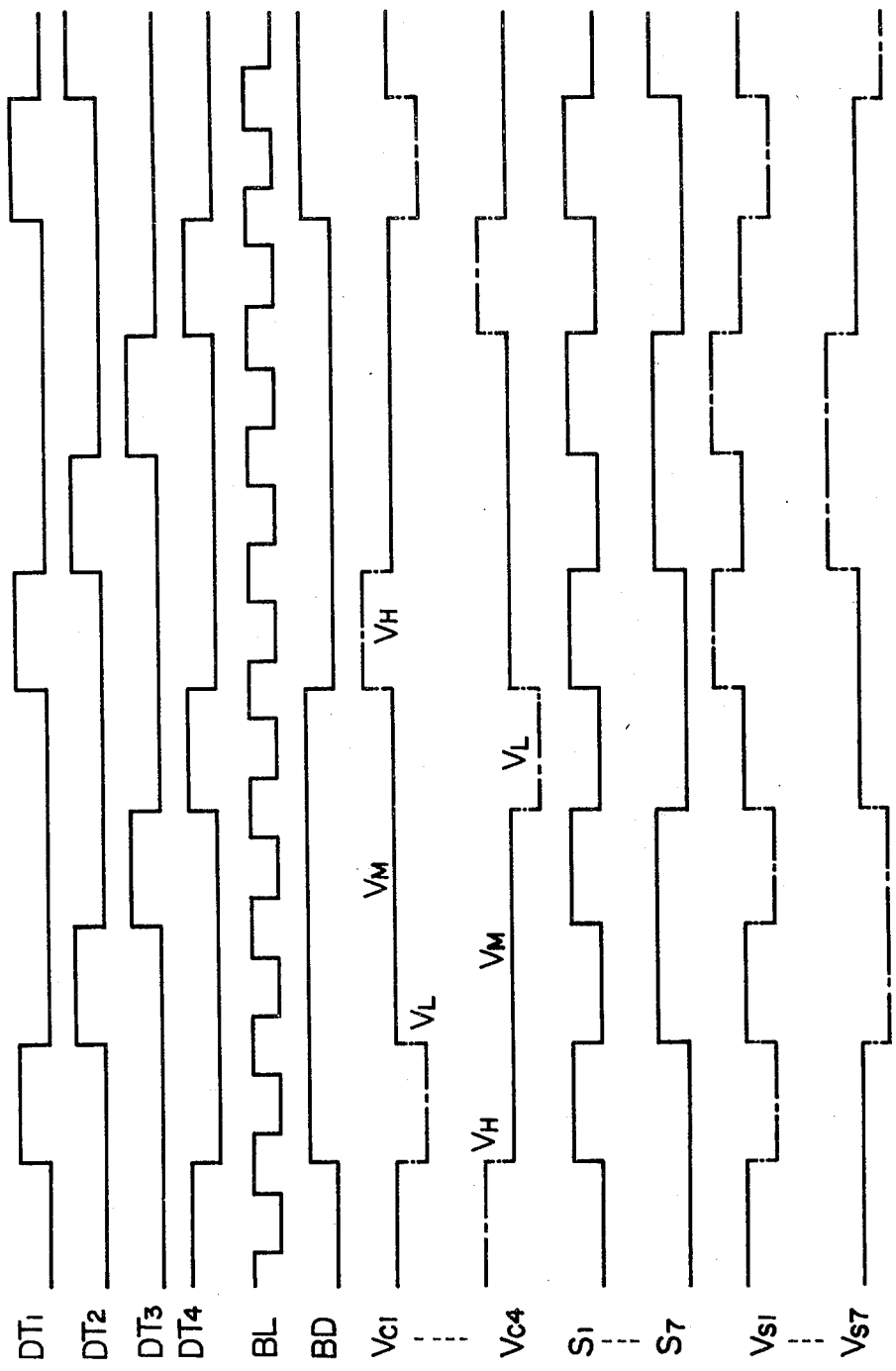
FIG. 4b is a timing diagram for explaining the operation thereof.

For the medium potential $V_M$, the voltage divider composed of the switching elements is not employed, but a separate power source is used. In order to prevent any current path from being established between the power source $V_M$ and the power source $V_H$ or $V_L$ at switching, transistors $M_{26}$, $M_{29}$ and transistors $M_{16}$, $M_{19}$ are rendered non-conductive at switching by a blanking signal BL as shown in FIG. 4b. The pulse width of the blanking signal BL must be longer than the switching time. When, however, it is made longer than is necessary, the electrode potential of the liquid crystal is held in a floating state for a long time and hence, the problem of crosstalk arises. Care is required in this respect.

The relations among the electrode potentials $V_{cl}$ and $V_{sl}$ of the liquid crystal display device and the signals $DT_l$, $S_l$, BD and BL are given in FIG. 4b and the following Table II:

Table II

| $DT_1$ | BD | BL | $V_{cl}$ | $S_1$ | BD | BL | $S_{sl}$ |
|---|---|---|---|---|---|---|---|
| "0" | "0" | "0" | $V_M$ | "0" | "0" | "0" | $V_M$ |
| "0" | "0" | "1" | $V_M$ | "0" | "0" | "1" | $V_M$ |
| "0" | "1" | "0" | $V_M$ | "0" | "1" | "0" | $V_M$ |
| "0" | "1" | "1" | $V_M$ | "0" | "1" | "1" | $V_M$ |
| "1" | "0" | "0" | $V_H$ | "1" | "0" | "0" | $V_L$ |
| "1" | "0" | "1" | FL | "1" | "0" | "1" | FL |
| "1" | "1" | "0" | $V_L$ | "1" | "1" | "0" | $V_H$ |
| "1" | "1" | "1" | FL | "1" | "1" | "1" | FL |

FL: floating state (floating potential)

It will be understood from the above explanation that, in accordance with the embodiment, only the small potential differences $|V_H - V_M|$ and $|V_M - V_L|$ are applied between the segment electrodes, so that the change of the visual state of the liquid crystal attributed to the large potential difference between the segment electrodes is prevented and that the life of the liquid crystal can be lengthened.

Although the present invention has been described for preferred embodiments, it can adopt various modification means without being restricted to them.

For example, the present invention is applicable, not only to the liquid crystal display devices of the segment type, but also to those of the matrix type. For the medium voltage $V_M$, a pulse whose potential varies with time can also be used insofar as the previously-mentioned conditions are met. As the constituent elements of the driver circuit, there can also be utilized the transistors of the single channel, bipolar transistors, passive elements, etc.

While I have shown and described several embodiments in accordance with the present invention, it is understood that the same is not limited thereto but is susceptible of numerous changes and modifications as known to those skilled in the art, and I therefore do not wish to be limited to the details shown and described herein but intend to cover all such changes and modifications as are obvious to one of ordinary skill in the art.

What I claim is:

1. A system for driving a liquid crystal display device including a first common electrode and a plurality of second electrodes, each of said second electrodes being spaced apart from said first common electrode through said liquid crystal therebetween, said system comprising:
   first means, coupled to said first electrode, for supplying a first drive signal thereto; and
   second means, coupled to said second electrodes, for selectively applying each of a plurality of different voltage levels including at least three voltage levels to each of said second electrodes, as a second drive signal, so as to drive said display device together with said first means.

2. A system for driving a liquid crystal display device, said device including a first common electrode, a plurality of second electrodes each spaced apart from said first electrode, and a liquid crystal medium the visible state of which changes from a first state to a second state at a predetermined potential difference thereacross, said liquid crystal medium being interposed between said first and second electrodes, said system comprising:
   first means, coupled to said first electrode, for selectively applying each of a plurality of different voltage levels including at least a first high-voltage level and a first low voltage level, as a first drive signal, to said first electrode; and
   second means, coupled to said second electrodes, for selectively applying each of a plurality of different voltage levels including at least a second high voltage level, a second low voltage level and a first middle voltage level, as a second drive signal, to each of said second electrodes, so as to drive said display device together with said first means.

3. The system according to claim 2, wherein the respective absolute values of the differences between said first high voltage level and said second low voltage level and between said second high voltage level and said first low voltage level are not less than said predetermined potential difference, and the respective absolute values of the differences between said first high voltage level and said first middle voltage level and between said first middle voltage level and said first low voltage level are less than said predetermined potential difference.

4. The system according to claim 3, wherein said first and second means includes means for supplying said second low voltage level to at least one selected one of said second electrodes and said first middle voltage level to the others of said second electrodes during the application of said first high voltage level to said first electrode, and means for supplying said second high voltage level to at least one selected one of said second electrodes and said first middle voltage level to the others of said second electrodes during the application of said first low voltage level to said first electrode, whereby said display device is bidirectionally driven and the respective absolute values of the differences of voltage between said selected ones and the others of said second electrodes are made to be smaller than the difference between said second high and low voltage levels.

5. The system according to claim 4, wherein said first high voltage level and said first low voltage level are substantially equal in value to said second high voltage level and said second low voltage level, respectively.

6. The system according to claim 3, wherein said first means includes means for supplying said first low and high voltage levels and a second middle voltage level to said first common electrode, and wherein the respective absolute values of the differences between said second high voltage level and said second middle voltage level and between said second middle voltage level and said second low voltage level are less than said predetermined potential difference.

* * * * *